United States Patent [19]

Lau et al.

[11] Patent Number: 4,502,783
[45] Date of Patent: Mar. 5, 1985

[54] ALIGNMENT STABILIZATION PRISM

[75] Inventors: Anthony S. Y. Lau, Culver City; Ernest W. Gossett, Jr., Glendora, both of Calif.

[73] Assignee: Hughes Aircraft Company, El Segundo, Calif.

[21] Appl. No.: 326,987

[22] Filed: Dec. 3, 1981

[51] Int. Cl.³ .............................................. G01B 11/26
[52] U.S. Cl. ................................. 356/152; 350/173; 350/401; 350/402; 356/138; 356/365
[58] Field of Search ............... 356/141, 152, 138, 365; 350/173, 400, 401, 402, 171, 172

[56] References Cited

U.S. PATENT DOCUMENTS

| | | | |
|---|---|---|---|
| 3,346,319 | 10/1967 | Billings | 350/172 |
| 3,389,632 | 6/1968 | Plummer | 356/152 |
| 3,601,613 | 8/1971 | Hock | 356/141 |
| 3,612,694 | 10/1971 | Mottier | 356/152 |
| 3,677,621 | 7/1972 | Smith | 350/173 |
| 3,844,638 | 10/1974 | Lingenfelder | 350/171 |

Primary Examiner—S. C. Buczinski
Attorney, Agent, or Firm—Lewis B. Sternfels; William J. Bethurum; A. W. Karambelas

[57] ABSTRACT

Apparatus (20) provides a stable optical reference in the presence of optical source jitter. It comprises a beamsplitter cube (21) having an input surface 22, an output surface 23, a totally reflecting surface (24), and a partially reflecting diagonal surface (26) with a corner cube 27 disposed on a surface (25) opposite to the input surface. An input beam (30) applied to the beamsplitter cube results in two output beams (33, 33'), coplanar with an output optical axis (31), if the input beam deviates at 32 from an input optical axis. The two output beams deviate equally but oppositely from the output axis. This provides signals from which a stable output optical axis may be determined. A polarization-sensitive embodiment is also disclosed which eliminates problems associated with the use of coherent light sources.

11 Claims, 6 Drawing Figures

ALIGNMENT STABILIZATION PRISM

BACKGROUND

The present invention relates generally to optical alignment devices, and more particularly to optical alignment devices which provide a stable reference in the presence of optical source jitter.

In optical systems, such as those employed in optical tracking systems, or satellite communications and detection systems, or the like, it is desirous to known the line-of-sight pointing direction to a high degree of accuracy. This knowledge insures accurate pointing of the optical system to any desired angular position.

It is common for the optical system to include a laser source, or the like, which provides a collimated beam which is used as an optical reference for alignment purposes. The laser source may be located on a gyrostablized platform while the beam propagates throughout the rest of the optical system located off the stabilized platform.

Problems arise in determining the line-of-sight provided by the laser beam due to inherent jitter present in the beam. The jitter may be derived from such causes as vibration, heating effects or feedback problems within the laser source.

Some prior art methods of producing a stabilized output beam have employed two optical channels comprising a plurality of penta-prisms, beamsplitters, and roof prisms totaling eight cemented components. Such a configuration is both complex to manufacture and costly due to the number of optical components. Furthermore, in order to achieve high angular system accuracy, for example, in the nanoradian range, the precision required in manufacturing and assembling these components is well beyond the capability of the present state-of-the-art.

It would, therefore, be an improvement in the art to provide a device which may be utilized accurately to determine a reference axis, or line-of-sight, of an optical beam in the presence of optical source jitter.

It would also be an improvement in the art to provide a highly accurate and inexpensive device which may be employed to generate optical reference information in the presence of optical source jitter.

SUMMARY OF THE INVENTION

In order to overcome the deficiencies in prior art optical alignment systems, the present invention provides for an optical device which is capable of providing highly accurate optical reference information. The optical device is designed to receive an input beam and provide two output beams which are indicated of a stable output optical axis when the input beam deviates about an input optical axis.

Most generally, the invention comprises a beam-splitter and a corner cube. The beamsplitter has an input surface and an output surface adjacent to the input surface. A partially reflective surface extends diagonally from the juncture between the input and output surfaces to the juncture between third and fourth surfaces of the beamsplitter. A reflective material is disposed on the third surface while the corner cube is disposed on the fourth surface. Alternatively, the corner cube may be disposed on the third surface while the reflective material is disposed on the fourth surface.

In a preferred embodiment, the device comprises a beamsplitter cube which has an input surface, an output surface, a reflective surface disposed opposite to the output surface, and a partially reflective diagonal surface disposed so that an input beam entering through the input surface is reflected off the partially reflective diagonal surface and onto the reflective surface. A corner cube is disposed on a surface of the beamsplitter cube which is opposite to the input surface. The corner cube has an optical axis which is colinear with the input optical axis, although this is not a necessary requirement.

The optical device is such that, when an input beam enters the device through the input surface, it is both reflected from and transmitted through the partially reflective surface. The reflected portion of the input beam is further reflected from the totally reflective surface and then transmitted through the partially reflective surface and out of the device through the output surface. The transmitted portion of the input beam is reflected from the corner cube and then reflected from the partially reflective surface and out of the device through the output surface.

The nature of the optical device is such that any deviation of the input beam, such as is caused by optical jitter, or the like, results in two output beams, coplanar with the output optical axis, which deviate equally but oppositely from the output optical axis. Thus, the average of the instantaneous directions of the two output beam is indicative of a stable output optical axis.

The two output beams may be sensed optically by means of optical detectors and the like, and converted into electrical signals which may be processed to provide the reference axis data indicative of the stable output optical axis. At any point in time, the direction of a stable optical reference axis is known which may be derived from the directions of the two output beams.

Other embodiments provide for the use of a polarization-sensitive beamsplitter cube in conjunction with quarter and half-wave plates to provide two output beams having orthogonal polarizations. The use of modulation techniques with the polarization-sensitive beamsplitter allows AC detection techniques to be employed to determine the reference axis. Such modulation techniques involve the use of rotating polarizers or electro- and magneto-optic crystals to control the polarization state of the light from the optical source.

BRIEF DESCRIPTION OF THE DRAWINGS

The various features and advantages of the present invention may be more readily understood with reference to the following detailed description taken in conjunction with the accompanying drawings, wherein like reference numerals designate like structural elements which.

DETAILED DESCRIPTION

Figure 1:
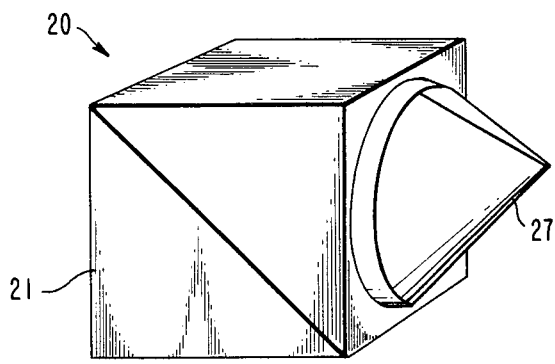
FIG. 1 illustrates a perspective view of an alignment stabilization prism in accordance with the principles of the present invention.
Figure 1A:
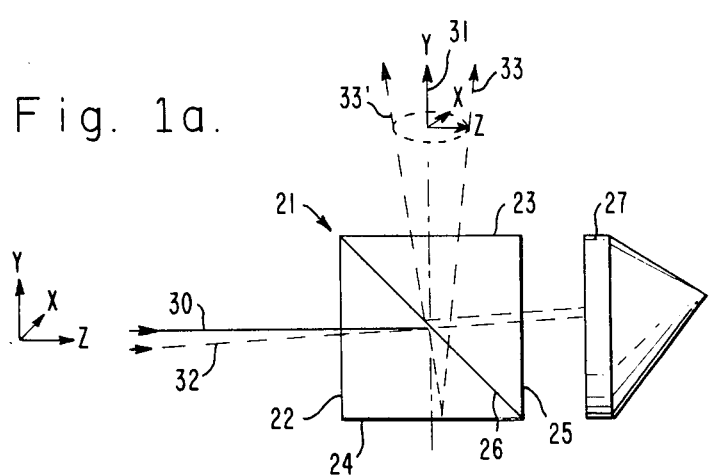
FIG. 1a shows an exploded view of the prism of FIG. 1 illustrating the operation thereof.

Referring to FIG. 1, there is shown a first embodiment of an alignment stabilization prism 20 in accordance with the principles of the present invention. The prism is comprised of a beamsplitter cube 21, alternatively referred to as beamsplitter 21, and a corner cube 27 disposed on a surface of the beamsplitter 21 opposite to surface utilized as an input surface to the prism 20. As shown also in FIG. 1a, the beamsplitter 21 has a first surface or input surface 22, a second surface or output surface 23, and a partially reflective or reflecting diagonal surface 26. A third surface 24 (bottom) of the beamsplitter 21 has a coating, or the like, deposited thereon which makes the third surface 24 totally reflecting. The third surface 24 will hereinafter be referred to as totally reflecting surface 24. The corner cube 27 is disposed on a fourth surface 25 of the beamsplitter 21 opposite to that of the input surface 22.

An input optical axis 30 is chosen along an axis such that, upon refraction through the input surface 22 and reflection off the partially reflective surface 26, an input beam is reflected so as to be normal to the totally reflective surface 24. An output optical axis 31 is along a line which is similarly determined by the angular relationship of the totally reflecting surface 24 to the output surface 23.

In operation, a collimated light beam entering the prism 20 along the input optical axis 30 with no deviation therefrom results in an output beam being transmitted along the output optical axis 31. However, as the input light beam deviates in angle or translation from the input optical axis 30, for example to the position identified by arrow 32, two output beams, coplanar to the output optical axis 31, are provided, as indicated by arrows 33, 33'. Any angular movement or deviation of the input light beam from the input optical axis 30 results in the two coplanar output beams 33, 33'. These two beams 33, 33' drift in equal and opposite directions from the output optical axis 31. Therefore, appropriate sensing of the two beams 33, 33' allows for an accurate determination of a stable output optical axis 30.

Figure 2:
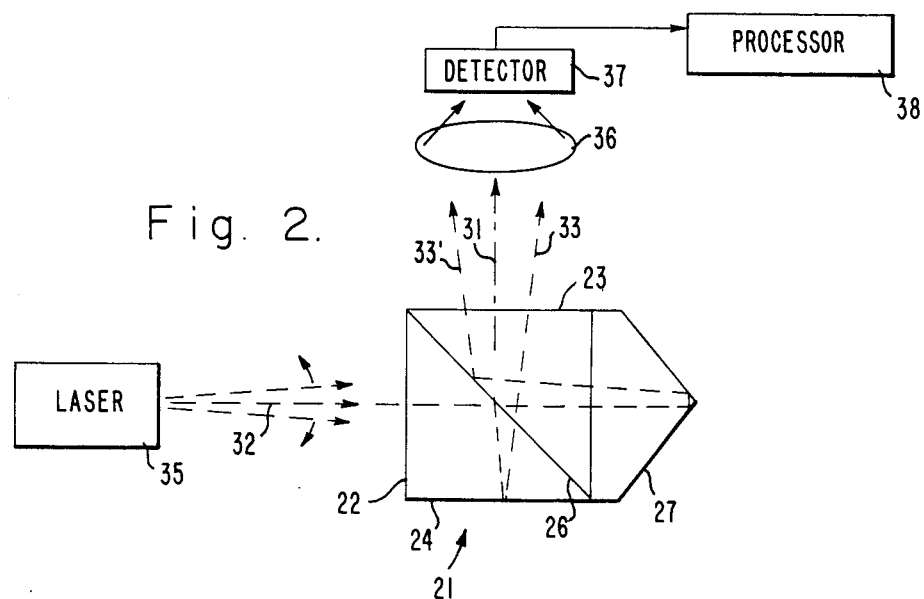
FIG. 2 shows a typical optical alignment system employing the prism of FIG. 1.

Referring to FIG. 2, there is shown a system employing the alignment stabilization prism 20 of FIG. 1. A light source, such as a laser 35, provides a collimated beam which is made incident upon the input surface 22 of the alignment stabilization prism 20. This collimated beam is the input beam 32 of FIG. 1. The input beam 32 traverses through the input surface 22 of the prism 20 and is reflected from the partially reflective surface 26 onto the totally reflecting surface 24, back through the partially reflected surface 26 and out of the prism 20 through the output surface 23. This first output beam is indicated as output beam 33. The laser input beam 32 is also transmitted through the partially reflective surface 26 and reflected by the corner cube 27 and the partially reflective surface 26 out of the prism 20 as beam 33'. The two output beams 33, 33' are focused by an optical system 36 onto a detector 37. The detector 37 is coupled to a signal processor 38, which is designed to analyze the electrical signals provided by the detector 37 in order to establish the location of the stable output optical axis 31.

Figure 3:
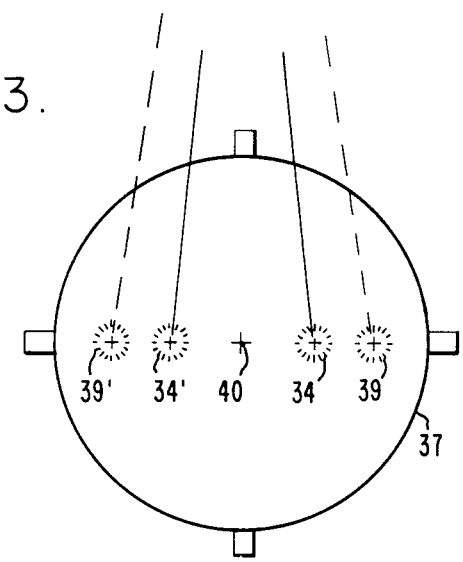
FIG. 3 is a diagram illustrating the operation of the system of FIG. 2.

One example of a detector 37 which is suitable for use in the system of FIG. 2 is a photopot, Model SC40, manufactured by United Detector Technologies, Incorporated. Such a detector is shown in FIG. 3. This detector 37 functions such that it provides output signals indicative of the centroid of the energy made incident thereupon. In terms of the energy transmitted by the prism 20, this centroid is indicative of the stable optical axis 31, and as such provides a stable reference axis for the system. FIG. 3 also shows the positions of spots 34, 34' created by the output beams 33, 33' on the detector 37 of FIG. 2. Further motion of the laser output beam results in a change in position of the two output beams 33, 33' to those identified as spots 39, 39'. As may be seen from FIG. 3, the two spots 34, 34' created by beams 33, 33' are disposed in opposite sides of a combined centroid position 40 which is indicative of the stable optical axis 31. This is also true for the two spots 39, 39' whose combined centroid is also indicative of the same optical axis 31.

The alignment stabilization prism 20 is such that any drift or jitter present in an input beam made incident thereupon results in two coplanar output beams which drift in equal but opposite directions about a stable output reference axis defined by the prism 20. The average angular direction of the output beams thus defines the stable output reference axis that may be optically sensed. The average angular direction of the two output beams remain stable with respect to the prism 20 irrespective of motion of the input beam.

In its simplest form, the prism 20 of FIG. 1 is comprised of a 50/50 beamsplitter 21 cemented to a corner cube 27. Because of its simple structure, manufacturing tolarances for its construction may be fairly loose. Optical error analysis performed on the prism 20 of FIG. 1 indicates that, to reduce input jitter of milliradians to output jitter or nanoradians, the critical wedge angles are on the order of minutes of arc. In order to achieve similar jitter reduction, the critical optical surfaces must be held to a flatness on the order of $\lambda/50$ to $\lambda/100$ over the aperture. The prism wedge angle and the flatness requirements are currently within the state-of-the-art of optical manufacturing.

Figure 4:
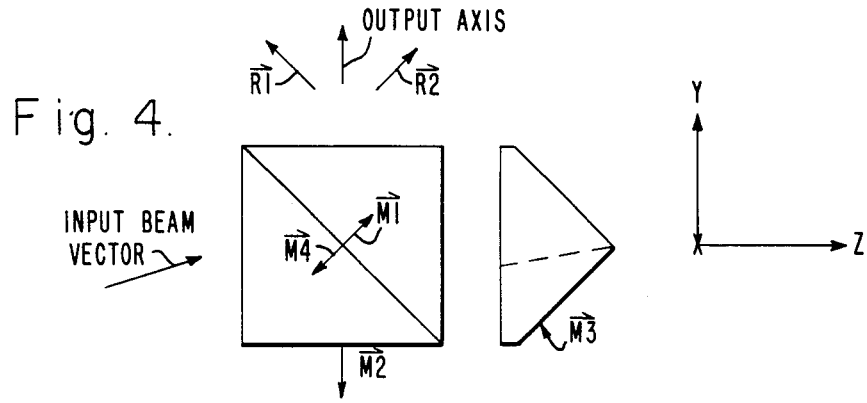
FIG. 4 is a diagram useful in understanding the optical properties of the prism of FIG. 1.

The operation of the prism 20 of FIG. 1 may be proved mathematically in terms of matrix algebra. The mathematics presented hereinbelow indicates that an input beam, which deviates from the input axis by an angle $\theta$, results in two output beams which are coplanar with the output axis 31, and which deviate by an angle $\theta$ but in opposite directions with respect to the output optical axis 31. FIG. 4 is useful in understanding the optical properties of the prism 20 of FIG. 1. The reflection matrices for the partially reflective surface 26 are indicated by M1 and M4, as well as the two separate beam paths C1 and C2. The direction cosines of the input beam vector are defined as $\alpha$, $\beta$, and $\cos \theta$, which satisfy the condition $$\alpha^2 + \beta^2 + \cos^2 \theta = 1. \qquad (1)$$

The input beam vector has the form $$\text{Input beam vector} = \begin{pmatrix} \alpha \\ \beta \\ \cos\theta \end{pmatrix},$$

while the matrices M1–M4 are $$M1 = M4 = \begin{pmatrix} 1 & 0 & 0 \\ 0 & 0 & -1 \\ 0 & -1 & 0 \end{pmatrix}$$

$$M2 = \begin{pmatrix} 1 & 0 & 0 \\ 0 & -1 & 0 \\ 0 & 0 & 1 \end{pmatrix}$$

$$M3 = \begin{pmatrix} -1 & 0 & 0 \\ 0 & -1 & 0 \\ 0 & 0 & -1 \end{pmatrix}$$

and $$C1 = M2M1 = \begin{pmatrix} 1 & 0 & 0 \\ 0 & 0 & 1 \\ 0 & -1 & 0 \end{pmatrix}$$

$$C2 = M4M3 = \begin{pmatrix} -1 & 0 & 0 \\ 0 & 0 & 1 \\ 0 & 1 & 0 \end{pmatrix}.$$

The two vectors representing the output beams then become $$\vec{R1} = C1 \begin{pmatrix} \alpha \\ \beta \\ \cos\theta \end{pmatrix} = \begin{pmatrix} \alpha \\ \cos\theta \\ -\beta \end{pmatrix}$$

$$\vec{R2} = C2 \begin{pmatrix} \alpha \\ \beta \\ \cos\theta \end{pmatrix} = \begin{pmatrix} -\alpha \\ \cos\theta \\ \beta \end{pmatrix}.$$

The output vectors $\vec{R1}$ and $\vec{R2}$ have the same direction cosine, cosine $\theta$, along the Y-axis (output axis). Since the direction cosines of the two output vectors along the X and Z axes are equal in absolute value but of opposite signs, their vector sum has only one component along the Y axis (output axis). This is shown from the relation $$\frac{R1 + R2}{|R1 + R2|} = \frac{1}{2\cos\theta} \times \begin{pmatrix} 0 \\ 2\cos\theta \\ 0 \end{pmatrix} = \begin{pmatrix} 0 \\ 1 \\ 0 \end{pmatrix}. \quad (2)$$

Note that this result is independent of the value chosen for $\alpha$, $\beta$, and cosine $\theta$. Therefore, the alignment stabilization prism 20 may be utilized with any jittering input beams, as long as they have positive direction cosines along the input axis.

Although the beamsplitting surface represented by vectors $\vec{M1}$ and $\vec{M4}$ is shown at an angle of 45° in FIG. 4, this angle is not required. For an arbitrary angle $\psi$, it may readily be proved that the beam path matrices are $$C1 = \begin{pmatrix} 1 & 0 & 0 \\ 0 & \cos2\psi & \sin2\psi \\ 0 & \sin2\psi & -\cos2\psi \end{pmatrix}$$

$$C2 = \begin{pmatrix} -1 & 0 & 0 \\ 0 & \cos2\psi & \sin2\psi \\ 0 & \sin2\psi & -\cos2\psi \end{pmatrix},$$

and the output vectors $\vec{R1}$ and $\vec{R2}$ are given by the matrices $$R1 = C1 \begin{pmatrix} \alpha \\ \beta \\ \cos\theta \end{pmatrix} = \begin{pmatrix} \alpha \\ \beta\cos2\psi + \cos\theta\sin2\psi \\ -\beta\sin2\psi + \cos\theta\cos2\psi \end{pmatrix}$$

$$R2 = C2 \begin{pmatrix} \alpha \\ \beta \\ \cos\theta \end{pmatrix} = \begin{pmatrix} -\alpha \\ \beta\cos2\psi + \cos\theta\sin2\psi \\ \beta\sin2\psi + \cos\theta\cos2\psi \end{pmatrix}.$$

Thus, the normalized vector sum of R1 and R2 becomes $$\frac{\vec{R1} + \vec{R2}}{|\vec{R1} + \vec{R2}|} = \quad (3)$$

$$\begin{pmatrix} 0 \\ 2(\beta\cos2\psi + \cos\theta\sin2\psi) \\ 0 \end{pmatrix} \frac{1}{2(\beta\cos2\psi + \cos\theta\sin2\psi)} = \begin{pmatrix} 0 \\ 1 \\ 0 \end{pmatrix}.$$

Note that Equation (3) shows the same result as Equation (2), regardless of the value chosen for $\psi$. This result is a consequence of the fact that the beam-splitting surface (partially reflecting surface 26) serves both as a beamsplitter and a beam combiner.

A beamsplitting ratio of 50/50 is also not necessary since each beam path uses this surface twice; once as a reflector and once as a transmitter. Thus, for unpolarized light, power throughput is the same for both beam paths regardless of beamsplitting ratio. Keeping the 50/50 ratio, however, maximizes overall optical throughput.

In addition to its insensitivity to beamsplitting angle and ratio, the alignment stabilization prism 20 is also insensitive to other parameter variations. For example, both wedge and pyramidal errors of the input surface 22 of the beamsplitter merely redefines the input axis. Errors introduced by the fourth surface 25 closest the corner cube 27 are self compensating because the corner cube 27 forces the beam return path to be angularly identical to the incident path.

Two possible problems may arise which should be overcome when encountered, in order to obtain optimum performance from the alignment stabilization prism 20. Reference is again made to FIG. 2. One is that each beam emerging from the prism 20 may not necessarily have the same intensity, since each beam traverses a different optical path. When this is the case, source jitter will not be totally removed by the prism. As the beam input angle to the prism changes, the two spots on the detector 37 will move in opposite but equal amounts. This results in the detector 37 sensing a centroid motion proportional to the intensity imbalance ($\Delta I$) and the source jitter ($\delta$) given by the equation false jitter motion $= (\delta \Delta I/(I1 + I2)$, where I1 and I2 are the beam intensities. Thus, for example, with a one percent intensity imbalance (1% of the average intensity), a reduction of a factor of 200 may be achieved in source jitter. Thus, 1/200 of the source jitter will appear in the movement of the reference axis 31.

A second problem relates to the use of coherent optical sources, such as the laser source 35. When the two coherent beams combine at the partially reflective surface 26 after reflection from the reflecting surface 24 and corner cube 27, interference may occur if the source 35 has sufficient coherence. This interference will change as the light output from the source 35 moves or jitters, and may result in a modulated signal intensity at the centroid detector 37. It is also possible that the energy centroid at the detector 37 may be affected, depending upon the relative image positions of the laser source 35 and beamsplitter 21. This phenomenon is undesirable in that it may lower the image intensity at the detector 37 or induce false centroid shifts, or both.

The problem of maintaining beam intensity balance may be solved in a number of ways. One solution is to insert a variable neutral density filter into one of the two beam paths; for example, between the corner cube 27 and the beamsplitter 21. The filter may be adjusted until the two beam paths have equal transmission. Using this method, the optical path to the corner cube 27 would be intentionally biased during manufacture to be higher in transmission.

Figure 5:
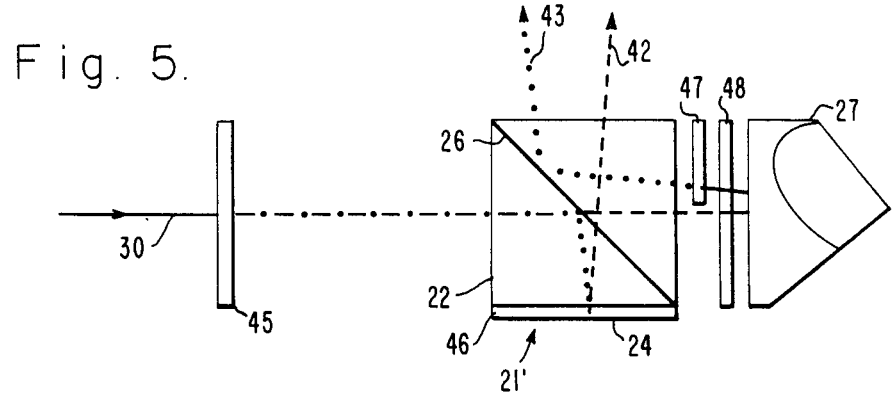
FIG. 5 illustrates an exploded view of a second embodiment of a prism in accordance with the principles of the present invention.

A second solution to the problem is depicted in FIG. 5, which, as will be shown below, also solves the second problem of interference due to coherence. FIG. 5 shows an exploded view of a second embodiment of an alignment stabilization prism in accordance with the principles of the present invention. This particular prism 20' is made utilizing a polarization-sensitive beamsplitter 21'. In addition to the components described with reference to FIG. 1, the prism 20' of FIG. 5 further comprises a first quarter-wave plate 46 disposed between the beamsplitter 21' and the reflective surface 24. In addition, a second quarter-wave plate 48 is disposed between the beamsplitter 21' and the corner cube 27. Also a half-wave plate 47 is disposed between the corner cube 27 and the beamsplitter 21' in a position that will input the light reflected by the corner cube 27 prior to entering the beamsplitter 21'. The quarter-wave plates 46, 48 and half-wave plate 47 rotate the plane of polarization of light transmitted by one-quarter wavelength (90°) and one-half wavelength (180°) respectively. The half-wave plate 47 only affects light transversing in only the direction to or from the corner cube 27.

An optical component 45, which may comprise a variety of optical devices, is disposed along the input optical path 30 between the source 35 and the prism 21'. In one embodiment, the optical component 45 may be a half-wave plate disposed between the source 35 and the prism 20'. The half-wave plate may be disposed on the input surface 22 of the prism 20'. This may be used with linearly polarized optical sources. The half-wave plate controls the angle of the plane of polarization of the light incident upon the prism 20'. For an unpolarized optical source, the half-wave plate may be replaced by a polarizer whose rotation controls the angle of the plane of polarization. Variations of this angle allows for control of the intensity of the transmitted and reflected beams at the beamsplitter 21.

Referring again to FIG. 5, the beam which is reflected at the partially reflective surface 26 is polarized perpendicular to the plane of incidence. This beam traverses the quarter-wave plate 46 which has been aligned to convert the state of polarization from linear to circular. The beam then reflects from the totally reflecting surface 24 and traverses the quarter-wave plate 46 once again. Upon reflection, the beam has reversed the state of circular polarization and the plane of polarization has been rotated 90°. This beam (polarized beam 42) is now transmitted by the beamsplitter 21' with high efficiency.

The beam, which is initially transmitted at the partially reflective surface 26, traverses through the quarter-wave plate 48 (adjusted to produce an eigen state of the corner cube) and is reflected by the corner cube 27 without undergoing a change in polarization. This beam is then converted back to linear polarization by the second pass through the quarter-wave plate 48. The half-wave plate 47 then rotates the plane of polarization of the beam which then reflects from the partially reflective surface 26 and provided as polarized output beam 43. This system exhibits excellent optical throughput, especially when operated at a single wavelength, such as may be done utilizing laser sources. The use of the polarization-sensitive beamsplitter 21' solves the second problem of interference due to a coherent source. Since each beam is polarized orthonally to one another, no interference can occur between them.

The optical component 45 of FIG. 5 may also be a half-wave plate which is continuously rotated or a half-wave modulator comprised of a commonly available electro-optic or magneto-optic modulator, which allows for continuous variation of the polarization of light made incident thereupon. This modulation may be employed to produce intentional variation in the relative intensities of the two output beams 42, 43 provided by the prism 20'. The result will be that first one beam 42 will be at maximum intensity with the other beam 43 at a minimum, and then vice-versa. The centroid detector 37 in the output optical path will see the centroid shift from that of one beam 42 by itself to that of the other beam 43 by itself. By using conventional AC detection techniques and averaging the two extremes which are detected, the true centroid may be found. Intensity differences between the two beams 42, 43 are no longer a factor.

Table I provides a summary comparison of the possible approaches which may be employed to produce the alignment stabilization prisms disclosed hereinabove. The choice of embodiment is at the discretion of the user, based on individual system constraints and intended application.

It is to be understood that the above-described embodiments are merely illustrative of some of the many specific embodiments which represent applications of the principles of the present invention. Clearly numerous and varied other arrangements may readily be devised by those skilled in the art without departing from the spirit and scope of the invention. For example, it should be clear that the corner cube may be interchanged with the totally reflective surface without changing the operation of the alignment stabilization prism.

TABLE I

| TYPE | SPECIAL CHARACTERISTICS | BENE-FITS | DEFICIENCIES |
|---|---|---|---|
| Un-polarized | Uncompensated for transmission between beams | 1,12 | 3,6,9,11 |
| Un-polarized | N.D. compansation of transmission | 1,7,12 | 3,9,11 |
| Polarized | Passively compensated for transmission | 7,10,12 | 2,9 |
| Polarized | Rotating half wave | 7,8,10 | 2,4 |

TABLE I-continued

| TYPE | SPECIAL CHARACTERISTICS | BENE-FITS | DEFICIENCIES |
| --- | --- | --- | --- |
| Polarized | plate (or polarizer Electro-optic modulation of polarization | 7,8,10,12 | 2,5 |
| Polarized | Magneto-optic modulation of polarization | 7,8,10,12 | 2,13 |

1 Full aperture useable.
2 Only ½ of aperture useable.
3 Modulation of transmission by corner cube edges with beam motion.
4 Moving parts.
5 High voltage.
6 Beams have unequal intensity.
7 Beams have equal intensity.
8 Insensitive to contamination and aging.
9 Sensitive to contamination and aging.
10 High throughput.
11 Low throughput.
12 No moving parts
13 Magnetic fields.

What is claimed is:

1. An optical device capable of three-dimensional beam stabilization, comprising:
a beamsplitter having an input surface, an output surface having a juncture with said input surface, a partially reflecting surface which extends diagonally through said beamsplitter from the juncture between said input and output surfaces, a totally reflecting third surface and a fourth surface having a juncture with said third surface, said partially reflecting surface extending to the juncture between said third and fourth surfaces; and
a corner cube optically coupled to said fourth surface.

2. The optical device of claim 1 wherein said totally reflecting surface is disposed opposite from said output surface and said corner cube is disposed opposite from said input surface.

3. The optical device of claim 1 wherein said totally reflecting surface is disposed opposite from said input surface and said corner cube is disposed opposite from said output surface.

4. The optical device of claim 1 wherein said totally reflecting surface comprises a reflective coating deposited on the surface of said beamsplitter.

5. The optical device of claim 1 wherein said totally reflecting surface comprises totally reflecting optical coating deposited on said third surface.

6. An optical device comprising:
a beamsplitter having an input surface, an output surface having a juncture with said input surface, a partially reflecting surface which extends diagonally through said beamsplitter from the juncture between said input and output surfaces, a third surface and a fourth surface having a juncture with said third surface, said partially reflecting surface extending to the juncture between said third and fourth surfaces;
a totally reflecting material disposed on said third surface;
a corner cube disposed on said fourth surface;
polarizing means disposed along an input optical axis to said beamsplitter;
first quarter-wave rotation means disposed between said totally reflecting material and said third surface for rotating the plane of polarization of light transmitted thereby by one-quarter wavelength;
second quarter-wave rotation means disposed between said corner cube and said fourth surface for rotating the plane of polarization of light transmitted thereby by one-quarter wavelength; and
half-wave rotation means for rotating the plane of polarization of light transmitted thereby by one-quarter wavelength disposed between said corner cube and said fourth surface extending across a predetermined portion of said fourth surface.

7. The optical device of claim 6 wherein said totally reflecting surface is disposed opposite from said output surface and said corner cube is disposed opposite from said input surface.

8. The optical device of claim 6 wherein said totally reflecting surface is disposed opposite from said input surface and said corner cube is disposed opposite from said output surface.

9. A three-dimensional optical beam stabilizing device for receiving an input beam and providing two output beams which are indicative of a stable output optical axis when the input beam deviates about an input optical axis associated with said device, said device comprising:
a beamsplitter having an input surface, an output surface, a totally reflecting surface disposed opposite to said output surface, and a partially reflecting diagonal surface disposed such that an input beam which enters through said input surface is reflected from said partially reflecting surface onto said totally reflecting surface; and
a corner cube optically coupled to a surface of said beamsplitter which is opposite to said input surface, said corner cube having an optical axis which is substantially colinear with the input optical axis;
said beamsplitter and corner cube responding to the input beam and providing two output beams, coplanar with the stable output optical axis, which deviate equally and oppositely from the stable output axis, the two beams thus being indicative of the stable output optical axis.

10. A three-dimensional optical beam stabilizing device for receiving an input beam and providing two output beams which are indicative of a stable output optical axis when the input beam deviates about an input optical axis associated with said device, said device comprising:
a beamsplitter having an input surface, an output surface, a totally reflecting surface disposed opposite to said output surface, and a partially reflecting diagonal surface disposed such that an input beam which enters through said input surface is reflected from said partially reflecting surface onto said totally reflecting surface; and
a corner cube optically coupled to a surface of said beamsplitter which is opposite to said input surface, said corner cube having an optical axis which is colinear with the input optical axis;
whereby an input beam entering said device through said input surface is both reflected from and transmitted through said partially reflecting surface, the reflected portion of the input beam being reflected from said totally reflecting surface and transmitted through said partially reflecting surface and out of said device through said output surface, the transmitted portion of the output beam reflected from said corner cube and reflected from said partially reflecting surface and out of said device through said output surface, and whereby any deviation of the input beam from the input optical axis results in two coplanar output beams which deviate equally from the output optical axis, the two output beams being indicative of a stable output optical axis.

11. A three-dimensional optical beam stabilizing apparatus for providing signals indicative of a stable optical axis in response to optical input signals which deviate about an input axis, said apparatus comprising:

a beamsplitter having an input surface, an output surface having a juncture with said input surface, a partially reflecting surface which extends diagonally through said beamsplitter from the juncture between said input and output surfaces, a totally reflecting third surface, and a fourth surface having a juncture with said third surface, said partially reflecting surface extending to the juncture between said third and fourth surfaces;

a corner cube optically coupled to said fourth surface;

optical focusing means for focusing optical signals which are transmitted by said beamsplitter by way of output surface;

a centroid detector for receiving the optical signals transmitted by said optical focusing means and for providing output signals indicative of the centroid of energy incident thereupon; and a signal processor for providing output signals indicative of a stable optical axis derived from the output signals provided by said detector;

whereby deviation of the optical input signals about the input axis results in two output beams, coplanar with the stable optical axis, which are detected by said detector and processed by said processor to provide the output signals which are indicative of the stable optical axis.

* * * * *